Patented Mar. 5, 1940

2,192,704

UNITED STATES PATENT OFFICE 2,192,704

PHTHALOCYANINE PIGMENT

Miles Augustinus Dahlen and Stanley Rawlings Detrick, Wilmington, Del., assignors to E. I. du Pont de Nemours & Company, Wilmington, Del., a corporation of Delaware No Drawing. Application September 10, 1937, Serial No. 163,242

2 Claims. (Cl. 134—58)

This invention relates to colored organic pigments. More particularly it relates to processes for modifying the physical properties of phthalocyanine pigments.

It is an object of this invention to prepare phthalocyanine pigments of improved physical properties, which will adapt them better for their various uses in the arts of making printing inks, lacquers and paints. It is a further object of this invention to provide a method for controlling the physical properties of phthalocyanine pigments, especially as they relate to masstone, brightness, and tinctorial strength. It is a further, special object of this invention to prepare copper phthalocyanines, or other specific phthalocyanine compounds, in a form which gives a printing ink of jet masstone effect. Other and further useful objects of this invention will appear as the description proceeds.

In the manufacture of organic pigments, numerous physical properties of the products determine their commercial value. Obviously high tinctorial value is most important. However, when deep shades are desired in printing inks, synthetic finishes, etc., the property of masstone is likewise very important. Masstone is defined as the color which a pigment has when a film of it is viewed by reflected light and when the film is of sufficient thickness to prevent any light from the background from filtering through. Usually jet masstones are desired. The qualification jet implies that the color observed is free of whiteness or "milkiness."

The quality of brilliance or brightness is, of course, also important. As in all other manufacture of synthetic dyes, maximum brilliance always is an objective.

In the case of toners and lakes produced from azo colors containing acid groups, the control of their physical properties, such as tinctorial value, masstone, etc., is generally effected by the physical conditions under which the pigments are synthesized or laked. In the phthalocyanine pigments, however, the products are purified by acid-pasting. This is a procedure commonly followed in the preparation of vat dyes but hitherto virtually unknown in the manufacture of pigments. The investigations of conditions for acid-pasting have in the past all been directed toward securing optimum dyeing characteristics in the colors, not toward producing colors of optimum pigment properties.

Now we have discovered that the physical characteristics of a phthalocyanine pigment can be readily controlled by modifying the conditions of acid pasting in a novel and unforeseen manner. More particularly, we have found that the physical qualities of the resulting pigment can to a certain extent be controlled and modified by co-precipitating with the principal phthalocyanine coloring matter a small quantity of a different phthalocyanine compound hereinafter referred to as the control.

The result is quite surprising, because it was to be expected that the control would adulterate the principal color and affect detrimentally its brilliance as well as possibly other physical properties thereof. In the case of dyes, for instance, it is a well known principle that mixing colors dulls the shade. It was very much surprising that in the case of coloring matters of the phthalocyanine series, there are not only no detrimental effects on the brightness, but on the contrary, the latter is in most cases improved. The tinctorial strength is likewise increased in most cases in a surprising manner. In addition, the masstone of the pigment is generally improved, being rendered more jet than the masstone of the pure principal.

The above effects are particularly surprising in view of our observation that mere intimate mixing of the principal and color, for instance by milling, does not produce the improvements above noted. Our invention demands that the two colors be co-precipitated from a joint solution, which is most conveniently done by acid-pasting the two jointly as above set forth.

Accordingly, our invention comprises in principle the following steps:

A principal phthalocyanine pigment is mixed with a small percent of another phthalocyanine pigment and the mixture is dissolved in concentrated sulfuric acid or an equivalent solvent. The solution of the pigment mixture is drowned in a suitable quantity of water under proper conditions of temperature, agitation, etc. At this point, the two pigments are co-precipitated. The pigment suspension is filtered and washed acid-free. It may be washed further, treated with alkalies, assistants, etc., and again filtered. The final pigment cake is dried and ground. When the dried pigments are incorporated in a vehicle and compared with the same pigment precipitated in the absence of other phthalocyanines, marked differences in physical properties are noted.

Without limiting our invention to any particular details, the following examples are given to more fully illustrate the same. Parts mentioned are by weight.

EXAMPLE 1

TREATMENT OF COPPER PHTHALOCYANINE 23.75 parts of copper phthalocyanine (Jour. Chem. Soc., 1934, pp. 1027–1031) and 1.25 parts of zinc phthalocyanine were added to 250 parts of 98% sulfuric acid at 0° C. to +5° C. The mixture was agitated until all of the pigment was in solution. The acid solution then was added slowly to 2500 parts of water at 95° to 100° C. The suspension was filtered and washed acid-free. The pigment cake was returned to a 10% alkaline suspension containing 5 parts of 26% aqua ammonia. The suspension was filtered, washed alkali-free and dried at 90° to 100° C.

PREPARATION OF PRINTING INK 0.5 part of the dry pigment and 1 part of a linseed oil varnish were mixed with a spatula and spread over an area 6x10 inches, on a glass slab having a ground surface. The ink was rubbed 50 strokes with a muller. It was collected on a spatula, returned to the slab, and given 50 more strokes with the muller. The process was repeated once more and the ink was ready for examination.

TEST FOR MASSTONE

The standard (in this case copper phthalocyanine precipitated in the absence of other phthalocyanines) was rubbed in exactly the same manner, and sample and standard were examined side by side on bond paper.

On comparing the sample with the standard, the sample was found to be more jet in masstone.

TEST FOR BRIGHTNESS AND TINCTORIAL VALUE 0.150 part of the above ink and 2.5 parts of zinc oxide ink were mixed with a spatula, rubbed out with a muller as described above and examined together.

In this case the sample was found to be slightly greener, brighter and equal in strength compared with the standard.

Following the above-described technique, a number of other control phthalocyanines were co-precipitated with copper phthalocyanine in the same ratio as above. The results obtained are given in the following table.

*Table I*

| Control phthalocyanine used | Comparison with unadulterated copper phthalocyanine | | |
|---|---|---|---|
| | Masstone | Shade | Strength |
| Cobalt phthalocyanine | Very jet | Very slightly red | 10% stronger. |
| Nickel phthalocyanine | do | Slightly green bright | Equal. |
| Metal-free phthalocyanine | Jet | do | Do. |
| Lead phthalocyanine | do | do | Do. |
| Barium phthalocyanine | Slightly jet | do | 5% stronger. |
| Aluminum phthalocyanine | Much more jet | Greener brighter | 2.5% stronger. |

EXAMPLE 2

TREATMENT OF METAL-FREE PHTHALOCYANINE

In another series of pigment preparations, metal-free phthalocyanine (U. S. P. 2,000,051) was co-precipitated with a series of control phthalocyanines. The same procedure and ratio of principal phthalocyanine to control phthalocyanine was followed as described for copper phthalocyanine in Example 1.

All of these samples were tested against a sample of metal-free phthalocyanine precipitated in the absence of any other phthalocyanine. The results are shown in Table II.

*Table II*

| Control phthalocyanine used | Comparison with unadulterated metal-free phthalocyanine | | |
|---|---|---|---|
| | Masstone | Shade | Strength |
| Zinc phthalocyanine | More jet | Much redder | Equal. |
| Cobalt phthalocyanine | do | do | 2.5% stronger. |
| Nickel phthalocyanine | do | do | Equal. |
| Copper phthalocyanine | do | Very much redder | 5% stronger. |
| Lead phthalocyanine | do | Much redder | 5% weaker. |
| Barium phthalocyanine | do | do | 10% weaker. |
| Aluminum phthalocyanine | do | do | 10% weaker. |

EXAMPLE 3

TREATMENT OF ALUMINUM PHTHALOCYANINE

Another series of pigment preparations was made in which aluminum phthalocyanine (Br. Patent No. 410,814) was co-precipitated with other control phthalocyanines. The same procedure and ratio was followed as described for copper phthalocyanine.

All of the above samples were tested against a sample of aluminum phthalocyanine precipitated in the absence of other phthalocyanines. The results are shown in Table III.

*Table III*

| Control phthalocyanine used | Comparison with unadulterated aluminum phthalocyanine | | |
|---|---|---|---|
| | Masstone | Shade | Strength |
| Zinc phthalocyanine | Very slightly milky | Slightly green, slightly bright | 12½% stronger. |
| Cobalt phthalocyanine | Slightly milky | Red | 22½% stronger. |
| Nickel phthalocyanine | Very slightly milky | Slightly red bright | 12½% stronger. |
| Metal-free phthalocyanine | do | do | 17½% stronger. |
| Lead phthalocyanine | do | do | Do. |
| Barium phthalocyanine | Close | Slightly bright | Do. |
| Copper phthalocyanine | Slightly milky | Slightly red bright | 27½% stronger. |

EXAMPLE 4

TREATMENT OF CHLORINATED COPPER-PHTHALOCYANINE 23.75 parts of chlorinated copper-phthalocyanine (15–16 chlorine atoms per molecule; copending application of Fox, Serial No. 149,884) and 1.25 parts of zinc phthalocyanine were added to a mixture of 187.5 parts of sulfuric acid monohydrate and 62.5 parts of chloro-sulfonic-acid at 10° C. to 20° C. The mixture was agitated until all of the pigment was in solution. The acid solution was then added slowly to 2500 parts of water at 95° C. to 100° C. The suspension was filtered and washed acid-free. The pigment cake was returned to a 10% alkaline suspension containing 5 parts of 26% aqua ammonia. The suspension was filtered, washed alkali-free and dried at 90° to 100° C.

The method of testing the dried pigment was similar to that described under Example 1. In other experiments, in place of zinc phthalocyanine, equal amounts of various other control phthalocyanines were substituted.

All of the above samples were tested against a sample of the same chlorinated copper phthalocyanine precipitated in the absence of other phthalocyanines. The results are shown in Table IV.

*Table IV*

| Control phthalocyanine used | Comparison with unadulterated chloro-copper-phthalocyanine | | |
|---|---|---|---|
| | Masstone | Shade | Strength |
| Zinc phthalocyanine | Very jet | Very blue | 7½% stronger. |
| Cobalt phthalocyanine | do | Blue, dull | 15% stronger. |
| Nickel phthalocyanine | Jet | do | 10% stronger. |
| Metal-free phthalocyanine | do | do | 7½% stronger. |
| Lead phthalocyanine | do | Blue | Equal. |
| Barium phthalocyanine | Slightly jet | Slightly blue | Do. |
| Aluminum phthalocyanine | Very jet | Blue, slightly dull | Do. |

EXAMPLE 5

VARYING THE AMOUNT OF CONTROL

In order to illustrate the manner in which the degree of jetness may be controlled, copper phthalocyanine was coprecipitated with 1%, 2% and 5% of aluminum phthalocyanine. The same procedure was followed as described in Example 1.

The samples were tested against the same sample of crude copper phthalocyanine, precipitated in the absence of other phthalocyanines. The results are shown in Table V.

*Table V*

| Amount of aluminum phthalocyanine used, based on copper phthalocyanine | Comparison with unadulterated copper phthalocyanine | | |
|---|---|---|---|
| | Masstone | Shade | Strength |
| 1% | More jet | Greener, slightly brighter | 2.5% stronger. |
| 2% | do | do | Do. |
| 5% | Much more jet | Greener, brighter | Do. |

EXAMPLE 6

In order to show that co-precipitation of the pigments is necessary, a series of pigment preparations was made in which copper phthalocyanine paste and aluminum phthalocyanine paste were milled together. 28.6 parts (dry basis) of acid-pasted copper phthalocyanine as a 28.6% paste and .286 part (dry basis) of acid-pasted aluminum phthalocyanine as a 4.05% paste were mixed, the solids adjusted to 10% and the paste milled through a colloid mill. The product was dried at 90° to 100° C. Similarly, two other samples were prepared containing 2% and 5% of aluminum phthalocyanine, respectively. These samples were tested against a sample of the same precipitated copper phthalocyanine containing no other phthalocyanines. The results are shown in Table VI.

*Table VI*

| Percent aluminum phthalocyanine used | Comparison with copper phthalocyanine | | |
|---|---|---|---|
| | Masstone | Shade | Strength |
| 1% | Close | Greener | Equal. |
| 2% | do | do | Do. |
| 5% | do | do | Do. |

It is readily seen that the mere mixing of the two acid-pasted pigments causes no difference in either masstone or brilliance.

Although the above examples illustrate the invention only as it is applied to a few of the phthalocyanine series, it will be readily appreciated that it may be applied to other pigments of this series.

Although not less than 1% nor more than 5% of the co-precipitated control phthalocyanine was used in the examples, our invention is not limited to these quantities. Furthermore, the conditions of the precipitation, such as the amount of sulfuric acid used, amount of drowning water, temperature of solution and temperature of drowning may be varied over wide limits without defeating the object of this invention. Although the specific examples disclose only the co-precipitation of principal phthalocyanines plus control phthalocyanines from sulfuric acid solution or from mixtures of sulfuric acid and chlor-sulfonic-acid, it is obvious that other solvents may be employed. Of particular interest in this connection are phosphoric acid, anhydrous hydrofluoric acid, oleum and trichlor-acetic-acid. In general, our invention depends upon co-precipitation from a solution of the principal and control pigments, regardless of the nature of the solvent.

The advantages of our invention will now be readily apparent. It is known that phthalocyanine pigments, when used in full shades, have a "milky" or light appearance. This is especially characteristic of copper phthalocyanine. The trade, however, insists on a deeper, more jet shade. Furthermore, the trade demands a brighter shade in tints where the colored pigment is mixed with whites.

By the method of this invention we have found a simple and reliable method for controlling the jetness of the masstone and for increasing the brilliance of shade. The pigment obtained by this process shows an increased jetness and brilliance over untreated pigment. As will be obvious from the examples, in certain instances the tinctorial value of the pigments is also increased. This of course is an economic improvement over products of the prior art.

Stated briefly, our present invention makes possible the modification in an economical manner of the physical properties of phthalocyanine pigments, without sacrificing any of their outstanding fastness properties.

As is well known the phthalocyanine pigments now find important commercial use in the preparation of printing inks, paints, enamels, lacquers, colored rubber articles, colored paper, colored plastics, etc.

We claim:

1. The process of preparing a phthalocyanine pigment in an improved physical condition, which comprises dissolving the same in an acid solvent jointly with a different phthalocyanine pigment, the quantity of the latter being not over 5% by weight of the former, and then precipitating both jointly by diluting the mixture with water.

2. The process of preparing copper-phthalocyanine in a physical form having improved characteristics for use as a pigment, which comprises co-precipitating the same from sulfuric acid solution jointly with a different phthalocyanine pigment, the latter being present in quantity between 1 and 5% by weight of the former.

MILES AUGUSTINUS DAHLEN.
STANLEY RAWLINGS DETRICK.